United States Patent
Chen et al.

(10) Patent No.: US 10,639,606 B2
(45) Date of Patent: *May 5, 2020

(54) AEROGEL PARTICLE AND METHOD OF PRODUCING THE SAME

(71) Applicant: TAIWAN AEROGEL TECHNOLOGY MATERIALS CO., LTD., Tainan (TW)

(72) Inventors: Jean-Hong Chen, Tainan (TW); Tang-Hua Pan, Tainan (TW)

(73) Assignee: Taiwan Aerogel Technology Materials Co., Ltd., Tainan (TW)

(*) Notice: Subject to any disclaimer, the term of this patent is extended or adjusted under 35 U.S.C. 154(b) by 227 days.

This patent is subject to a terminal disclaimer.

(21) Appl. No.: 15/823,545

(22) Filed: Nov. 27, 2017

(65) Prior Publication Data

US 2018/0078918 A1    Mar. 22, 2018

Related U.S. Application Data

(62) Division of application No. 15/164,901, filed on May 26, 2016, now abandoned.

(30) Foreign Application Priority Data

May 27, 2015    (TW) .............................. 104116983 A

(51) Int. Cl.
*B01J 13/00*       (2006.01)
*C01B 33/159*    (2006.01)
(Continued)

(52) U.S. Cl.
CPC ......... *B01J 13/0091* (2013.01); *C01B 33/155* (2013.01); *C01B 33/159* (2013.01);
(Continued)

(58) Field of Classification Search
CPC ............................................ C01B 33/152–156
See application file for complete search history.

(56) References Cited

U.S. PATENT DOCUMENTS 5,270,027 A * 12/1993 Balducci ................ C01B 33/16
423/338
5,391,364 A *  2/1995 Cogliati ................. C01B 13/32
423/263
(Continued)

FOREIGN PATENT DOCUMENTS

CN    101259964 A  *  9/2008
TW    200835648 A      9/2008

OTHER PUBLICATIONS

Definition of aerogel. IUPAC Compendium of Chemical Terminology, 2nd Edition. https://goldbook.iupac.org/terms/view/A00173. As viewed on Aug. 9, 2019. (Year: 2019).*
(Continued)

Primary Examiner — Stephen E Rieth
(74) Attorney, Agent, or Firm — Rosenberg, Klein & Lee

(57) ABSTRACT

An aerogel particle is produced by following processes. A mixing process: an alkoxysilane compound is mixed with an organic solvent to form a first mixed solution. A hydrolysis process: an acid catalyst is added into the first mixed solution to perform a hydrolysis reaction, thereby obtaining a sol. A condensation process: an alkali catalyst is added into the sol to perform a condensation reaction, and a hydrophobic dispersion solvent is added and stirred during the condensation process, thereby subjecting sol to be gelled when it is stirred, further producing the aerogel particle with a uniform structure.

9 Claims, 7 Drawing Sheets

(51) Int. Cl.
  *C01B 33/155* (2006.01)
  *C01B 33/158* (2006.01)
  *F16L 59/06* (2006.01)
  *E04B 1/74* (2006.01)

(52) U.S. Cl.
  CPC ..... *C01B 33/1585* (2013.01); *E04B 2001/742* (2013.01); *F16L 59/06* (2013.01)

(56) References Cited

U.S. PATENT DOCUMENTS

| | | |
|---|---|---|
| 2007/0196656 A1 | 8/2007 | Rowell |
| 2010/0119432 A1 | 5/2010 | Yeo |
| 2012/0064345 A1* | 3/2012 | Gini .................. C01B 33/1546 428/402 |
| 2013/0189521 A1* | 7/2013 | Fukuju .................. C01B 33/16 428/402 |

OTHER PUBLICATIONS

Primene JM-T Information. LookChem. https://www.lookchem.com/Primene-JM-T/. As viewed on Aug. 9, 2019. (Year: 2019).*
Chaudhuri, S. R. et al. 4. Large Silica Monoliths. Sol-Gel Optics: Processing and Applications. Springer Science+Business Media New York. 1994. pp. 83-107. (Year: 1994).*
Machine Translation of CN101259964A. Sep. 10, 2008. (Year: 2008).*

* cited by examiner

AEROGEL PARTICLE AND METHOD OF PRODUCING THE SAME

RELATED APPLICATIONS

The present application is a Divisional Application of the U.S. application Ser. No. 15/164,901, filed May 26, 2016, which claims priority to Taiwan Application Serial Number 104116983, filed May 27, 2015, all of which are herein incorporated by reference.

BACKGROUND

Field of Invention

The present invention relates to an aerogel particle and a method of producing the same. More particularly, the present invention relates to an improved sol-gel method of producing an aerogel particle with a uniform particle structure.

Description of Related Art

An aerogel is a porous material, which has a stereoscopic network structure and very low thermal conductivity rate. The aerogel is generally applied in thermal isolation materials.

Typically, the aerogel is produced by a sol-gel method. A precursor such as alkoxysilane or methyl silicate is firstly mixed with an organic solvent, and then an acid catalyst is added therein to perform a hydrolysis reaction. When the hydrolysis reaction is performed for a given period of time, an alkali catalyst is added therein to perform a condensation reaction, thereby forming a gel during the condensation reaction gradually. Molecules in the gel are continuously condensed and bonded, so as to form a semisolid-state polymer gel gradually. The gel is aged for a given period of time and formed to a stably stereoscopic network structure. Finally, the solvent such as water, methanol and the like in the aerogel is extracted and dried by supercritical drying technology, thereby obtaining a dried block of porous aerogel.

The supercritical drying technology used in the aforementioned method can prevent the aerogel from being broken by a surface tension of the water under normal atmospheric pressure. However, the supercritical drying technology must be performed under high pressure, only a very small amount of the aerogel can be dried in each supercritical drying process. Accordingly, it is hard to produce the aerogel in mass and to reduce the production cost of the aerogel.

On the other hand, during application, the dried block of the aerogel must be crushed, but aerogel pieces crushed from the aerogel block by conventional methods generally have uneven structures and broken appearances (please refer to FIGS. 9 to 12), so that such pieces unlikely possess excellent thermal isolation property.

Some prior art such as Taiwan Patent Publication No. 200835648 discloses a porous material and a method of producing the same. Briefly, the porous material is synthesized by a sol-gel method, in which an alkoxysilane or a silicate compound reacts in an organic solvent, and the reactant is then modified by a modification agent for replacing a hydrophilic functional group on a surface of the porous material to a hydrophobic functional group, so that the porous material can be prevented from being broken by surface tension of the water. Therefore, the porous material can be dried at room temperature under normal atmospheric pressure.

The hydrophobic modification of the porous material of the aforementioned prior art is performed by multi-batch solvent displacement technology at room temperature under normal atmospheric pressure. However, the hydrophobic modification must be performed for more than 24 hours at room temperature under normal atmospheric pressure. Thus, such hydrophobic modification does not meet the cost efficiency due to too long processing time.

Moreover, when the aforementioned porous material is applied, the porous material needs to be crushed. Therefore, pieces crushed from the porous material also have defects of the uneven structures and the broken appearances.

SUMMARY

Accordingly, in order to improve the defects of poor thermal isolation property due to the uneven structure and the broken appearances of the conventional aerogel, a method of producing the aerogel particle is provided. The present method includes a mixing process, a hydrolysis process and a condensation process as follows. In the mixing process, an alkoxysilane compound is mixed with an organic solvent to form a first mixed solution. In the hydrolysis process, an acid catalyst is added into the first mixed solution to perform a hydrolysis reaction, thereby forming a sol. In the condensation process, an alkali catalyst is added into the sol to perform a condensation reaction, and a hydrophobic dispersion solvent is added and stirred during the condensation reaction. The sol is gelled when it is stirred, thereby producing a second mixed solution including the aerogel particle.

Further, the hydrophobic solvent includes but is not limited to ketone, ether, ester, aromatic and alkane.

Yet further, after the condensation process is performed, the method further comprises a post-treatment process subjected to the second mixed solution. The aforementioned aerogel particle is filtered out by a filter and washed by a mixed solution including ethanol and water. And then, the aerogel particle is dried at 100° C. to 115° C. in vacuum.

Yet further, after the condensation process is performed, the method further comprises a hydrophobic modified process subjected to the second mixed solution. The second mixed solution is heated to evaporate the organic solvent, and a chloryl organic molecule is added into the second mixed solution, thereby subjecting the chloryl organic molecule to react with a hydroxyl group of the aerogel particle. Therefore, the aerogel particle is hydrophobic, and the hydrophobic dispersion solvent can prevent the aerogel particle from being broken.

Yet further, the chloryl organic molecule can include but be not limited to chloryl alkoxysilane, chloryl alkane and chloryl phene.

Yet further, the organic solvent includes a mixture of ethanol and water. In the hydrophobic modified process, a temperature of the second mixed solution is varied sequentially to a first temperature, a second temperature and a third temperature. The first temperature is 78° C. to 82° C., the second temperature is 100° C. to 115° C., and the third temperature is 40° C. to 45° C. When the temperature of the second mixed solution is varied to the third temperature, the chloryl organic molecule is added.

Yet further, after the hydrophobic modified process is performed, the method further comprises a post-treatment process. The aerogel particle is filtered out by a filter and washed by toluene, and then the aerogel particle is dried in vacuum.

The present invention also provides an aerogel particle. The aerogel particle is produced by following processes. A mixing process: an alkoxysilane compound is mixed with an organic solvent to form a first mixed solution. A hydrolysis process: an acid catalyst is added into the first mixed solution to perform a hydrolysis reaction, thereby forming a sol. A condensation process: an alkali catalyst is added into the sol to perform a condensation reaction. A hydrophobic dispersion solvent is added and stirred during the condensation reaction. The sol is gelled when it is stirred, thereby producing the second mixed solution including the aerogel particle. A particle size of the aforementioned aerogel particle is 300 nm to 900 nm.

The present invention has following effects:

1. In the condensation process of the method of producing the present invention, the aerogel particle is stirred in a large amount of non-dissolved solvent, thereby producing uniform pearl-like structure aerogel particle with better thermal isolation, further thereby enhancing the practicality of the product.

2. The porosity and the pore size of the aerogel particle can be adjusted by the parameters of the method, such as an amount of the solvent, a viscosity of the solvent, an amount of the acid catalyst and an amount of the alkali catalyst.

3. The processing time of the aerogel particle can be controlled by adjusting the amount of the alkali catalyst.

4. A size of the sub-micro pearl-like aerogel particle can be efficiently controlled by adjusting the amount of the non-dissolved solvent and a stirring velocity. When the amount of the non-dissolved solvent is higher and the stirring velocity is faster, the size of the aerogel particle is smaller; relatively, when a viscosity of the non-dissolved solvent is lower and the stirring velocity is slower, the size of the aerogel particle is larger.

5. The processing time of the displacement technology can be decreased by controlling the temperature of the hydrophobic modified process. The hydrophilic or hydrophobic aerogel particle can be continuously produced in 4 hours to 5 hours, thereby enhancing the producing efficiency of the aerogel particle.

BRIEF DESCRIPTION OF THE DRAWINGS

The invention can be more fully understood by reading the following detailed description of the embodiment, with reference made to the accompanying drawings as follows.

DETAILED DESCRIPTION

According to the aforementioned features, the effects of the aerogel particle and the method of producing the same can be clearly showed by following embodiments.

Figure 1:
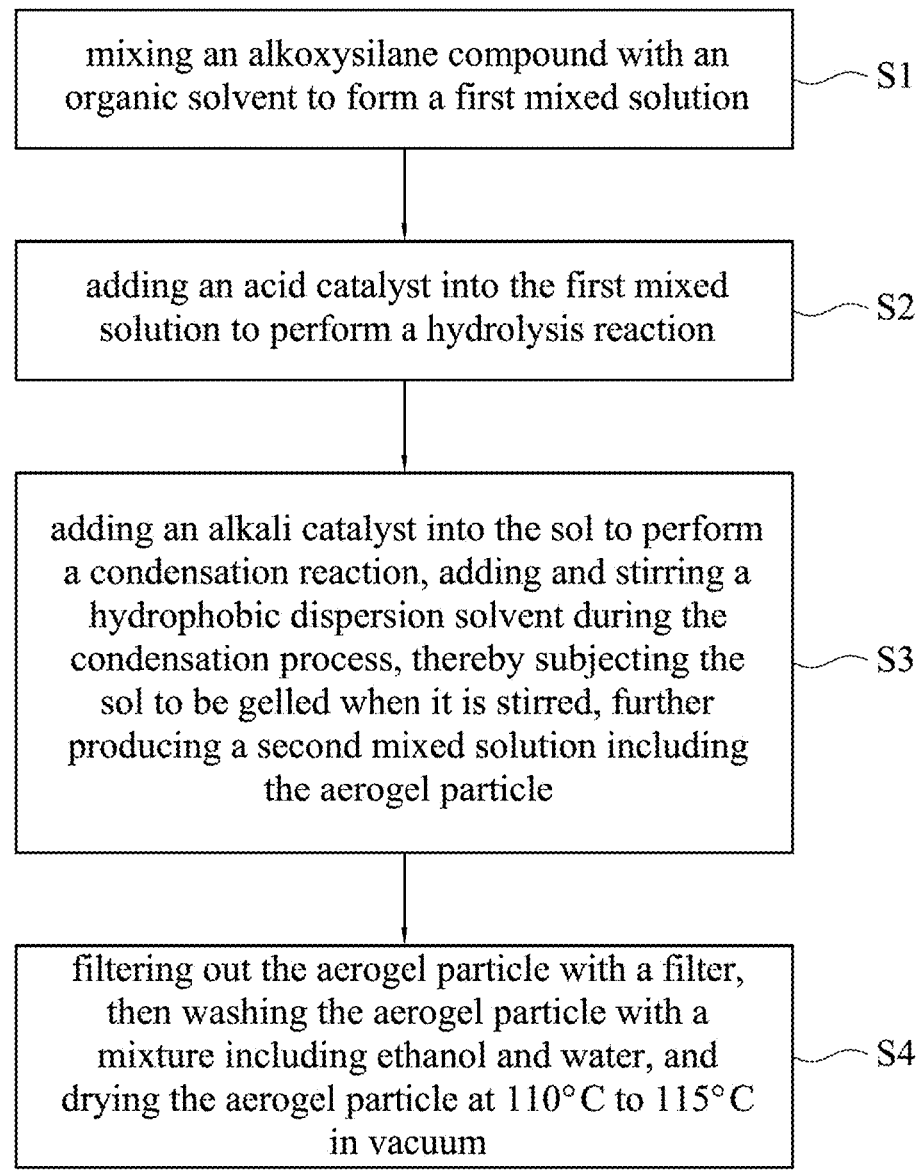
FIG. 1 is a flow chart according to an embodiment of the present invention.

Please refer to FIG. 1, which discloses the method of producing the aerogel particle according to an embodiment of the present invention. The method comprises following processes: a mixing process (S1), a hydrolysis process (S2), a condensation process (S3) and a post-treatment process (S4).

The mixing process (S1): an alkoxysilane compound is mixed with an organic solvent to form a first mixed solution. The alkoxysilane can be tetramethoxysilane (TMOS), tetraethoxysilane (TEOS), or a precursor of methyl silicate or the like. An amount of the alkoxysilane or the precursor of methyl silicate is 2.1 mol % to 12.5 mol %, and an amount of the organic solvent is 97.9 mol % to 87.5 mol %.

The hydrolysis process (S2): an acid catalyst is added into the first mixed solution to perform a hydrolysis reaction, thereby forming a sol. A ratio of an amount of the alkoxysilane to an amount of the acid catalyst is 1:0.3 to 1:0.001.

Besides, the ratio of the amount of the alkoxysilane to the amount of the acid catalyst is 1:0.001 to 1:0.3. When the ratio of the amount of the alkoxysilane to the amount of the acid catalyst is 1:0.001, the processing time of the hydrolysis reaction is 300 minutes. When the ratio of the amount of the alkoxysilane to the amount of the acid catalyst is 1:0.3, the processing time of the hydrolysis reaction is 10 minutes. Accordingly, the processing time of the hydrolysis reaction decreases as increasing of the amount of the acid catalyst.

The condensation process (S3): an alkali catalyst is added into the sol to perform a condensation reaction. A molar ratio of a mole of a mixed solution including the acid catalyst and the ethanol to a mole of a mixed solution including the alkali catalyst and the ethanol is 10:10 to 10:40. A molar ratio of a mole of the alkali catalyst to a mole of the acid catalyst is 1.0:1.0 to 3.0:1.0.

In the mixed solution including the alkali catalyst and the ethanol, a condensation reaction time (i.e. a gelling time of the aerogel) is distinctly decreased as increasing the amount of the alkali catalyst. When the molar ratio of the mole of the alkali catalyst to the mole of the acid catalyst is 1.0:1.0, the gelling time essentially is 1600 minutes. When the molar ratio of the mole of the alkali catalyst to the mole of the acid catalyst is 3.0:1.0, the gelling time is decreased to 5 minutes. Therefore, the processing time can be adjusted by controlling the molar ratio of the mole of the alkali catalyst to the mole of the acid catalyst.

When the condensation reaction of the condensation process (S3) approximately complete, the first mixed solution that has been subjected to the hydrolysis reaction (i.e. a mixed solution after hydrolysis) is formed to a sol. When the mixed solution after hydrolysis is controlled to a sol, a large amount of the non-dissolved hydrophobic dispersion solvent is added into the sol to form a second mixed solution, and the second mixed solution is stirred at 1200 rpm to 2000 rpm. Accordingly, the sol is gelled, thereby forming a pearl structure or ball structure aerogel particle due to a repulsion of the hydrophobic dispersion solvent under a fast stirring. A particle size of the aerogel particle essentially is 300 nm to 900 nm.

The aforementioned hydrophobic dispersion solvent can be ketone of 6 to 16 carbons, ether of 6 to 16 carbons, ester of 6 to 16 carbons, aromatic of 7 to 16 carbons, alkane of 8 to 20 carbons, halogenated ether, halogenated ester, halogenated aromatic, halogenated alkane and the like. For example, the hydrophobic dispersion solvent can be toluene, kerosene, cleaning naphtha or the like.

The post-treatment process (S4): the aerogel particle is filtered out by a filter, and the aerogel particle is washed by a mixed solution including ethanol and water for 3 to 4 times. Then, the aerogel particle is dried at 110° C. to 115° C. in vacuum, thereby obtaining the aerogel particle.

Figure 2:
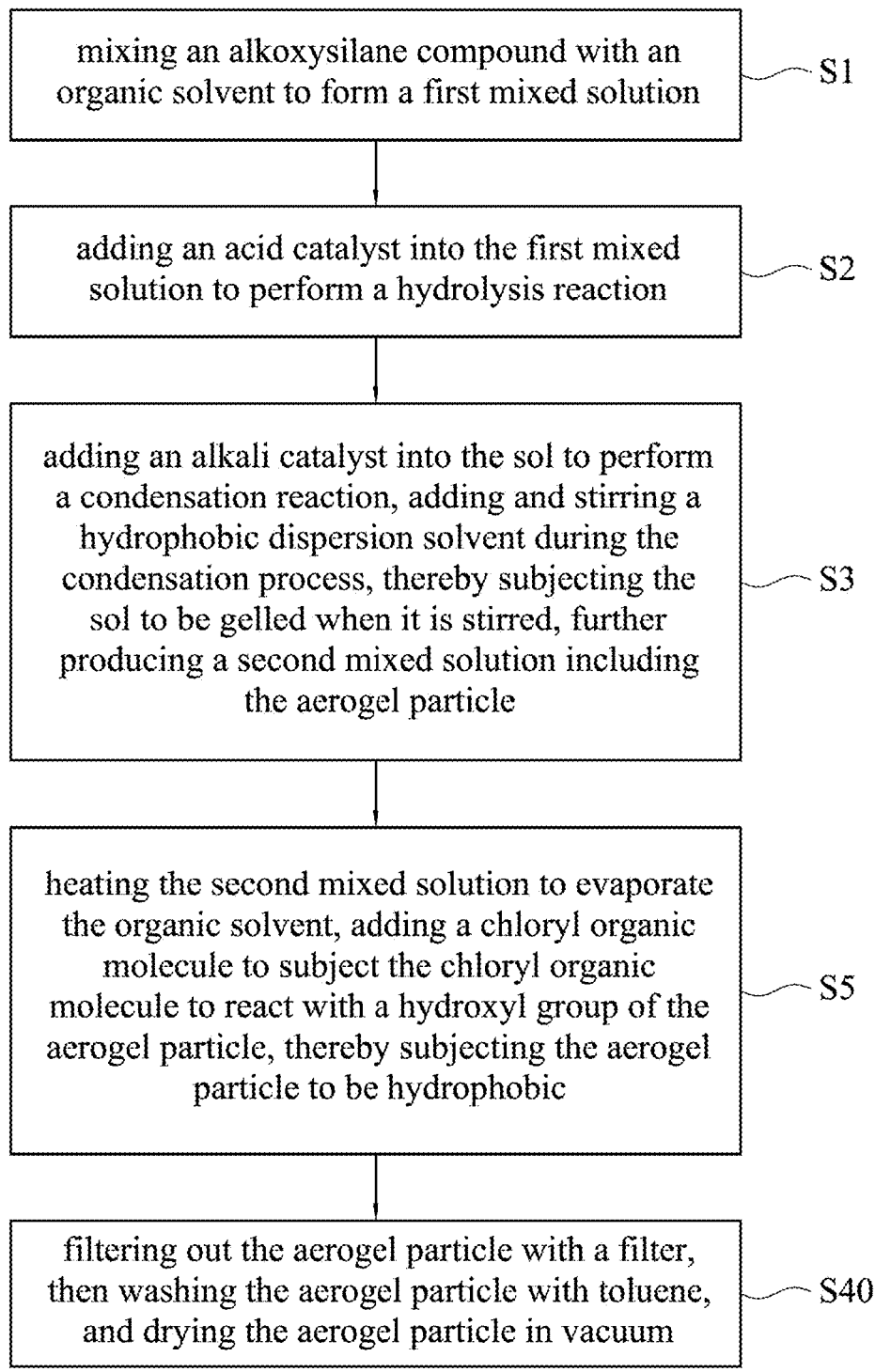
FIG. 2 is a flow chart with the modified process according to an embodiment of the present invention.

Please refer to FIG. 2, which is a flow chart with the modified process according to an embodiment of the present invention. Preferably, the aforementioned aerogel particle can further be subjected to a hydrophobic modified process. After the condensation process (S4) is performed, the method can further comprise a hydrophobic modified process (S5) subjected to the second mixed solution. A temperature of the second mixed solution is sequentially varied to a first temperature, a second temperature and a third temperature. The first temperature is 78° C. to 82° C., thereby evaporating the ethanol in the second mixed solution (a boiling point of the ethanol is 78° C.). The second temperature is 100° C. to 115° C. (a boiling point of the water is 100° C.), thereby evaporating the water in the second mixed solution. The third temperature is 40° C. to 45° C.

When the temperature of the second mixed solution is varied to the third temperature, a chloryl organic molecule is added. The chloryl organic molecule is selected from a group consisting of chloryl alkoxysilane, chloryl alkane, chloryl phene or a combination thereof.

Accordingly, the chloryl organic molecule is subjected to react with a hydroxyl group of the aforementioned aerogel particle, thereby subjecting the aerogel particle to be hydrophobic. Moreover, the repulsion between the hydrophobic dispersion solvent and the aerogel particle can prevent the aforementioned aerogel particle from being broken. If the aerogel particle is subjected to the hydrophobic modified process (S5), the aerogel particle is washed by toluene in the post-treatment process (S40) to remove the chloryl organic molecule. And then, the washed aerogel particle is dried in vacuum.

Therefore, the method of the present invention can produce the uniform sub-micro porous aerogel particle with ball structure. On one hand, the method of the present invention can enhance the homogeneity of the appearances and the structure of the aerogel particle, thereby increasing the applicability. On the other hand, the present method can produce the hydrophobic modified aerogel particle by evaporating with heating and adding the chloryl organic molecule, thereby being easily to be produced with a large amount, further thereby enlarging the applied scope.

Please refer to the following Table 1, which shows a comparison of the aerogel particle according to an embodiment of the present invention between before-modification and after-modification by a surface area and porosimetric analyzer (BET):

Table 1

| Sample | $S_{BET}$ (m$^2$/g) | $V_{pore}$ (cm$^3$/g) | $D_p$ (nm) | $S_{micro}$ (m$^2$/g) | $V_{micro}$ (cm$^3$/g) |
|---|---|---|---|---|---|
| Aerogel Particle (Before-Modification) | 531 | 2.67 | 18.92 | 51 | 0.017 |
| Aerogel Particle (After-Modification) | 784 | 3.42 | 16.28 | 42 | 0.021 |

In Table 1, $S_{BET}$ represents a specific surface area measured by BET; $V_{pore}$ represents a volume of the pore measured by BET; $D_p$ represents a diameter of the pore measured by BET; $S_{micro}$ represents a specific surface area of the micro pore; and $V_{micro}$ represents a volume of the micro pore.

In Table 1, per unit weight of the before-modification and after-modification aerogel particle are respectively measured by the BET. When the BET is vacuumed until P/Po is equal to 0, a nitrogen gas is introduced after the solvent or an absorbed impurity in the aerogel particle is removed. When the aerogel particle absorbs the nitrogen gas until P/Po is equal to 1, the nitrogen gas is vacuumed to subject the aerogel particle with saturated nitrogen gas to be desorbed until P/Po is equal to 0. In the absorbed process and the desorbed process, the absorbed curve and the desorbed curve are measured and analyzed, thereby obtaining the relative result of the specific surface area.

Figure 3:
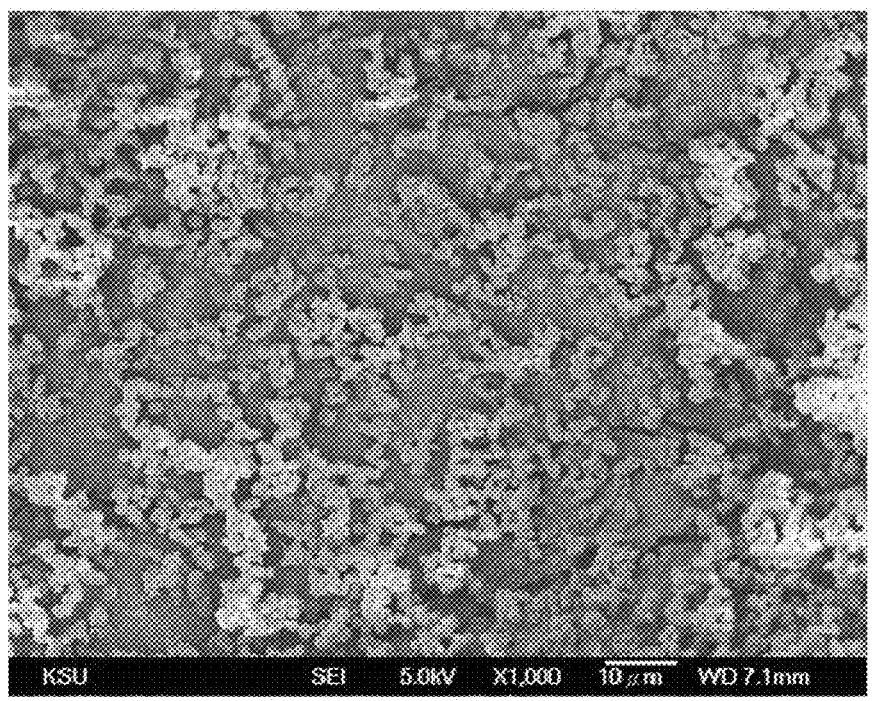
FIG. 3 is a scanning electron microscope picture of the aerogel particle of the present invention when the stirring velocity is 1200 rpm.
Figure 4:
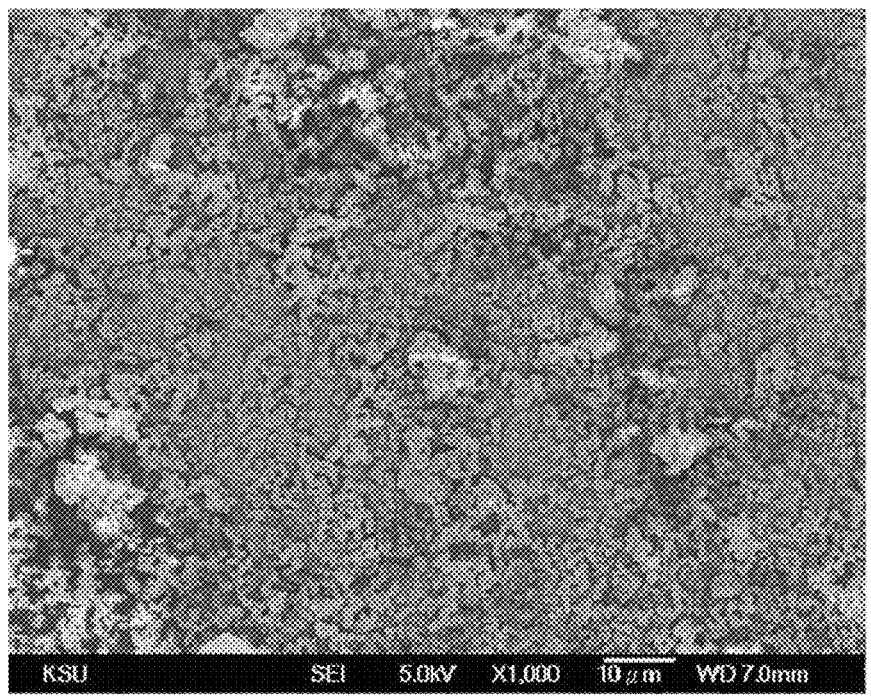
FIG. 4 is a scanning electron microscope picture of the aerogel particle of the present invention when the stirring velocity is 1800 rpm.

Please refer to FIG. 3 and FIG. 4, which are microscope pictures of the appearances and the structure of the aerogel particle by scanning electron microscope in different scale. FIG. 3 and FIG. 4 show the structure of the aerogel particle has uniform and high homogeneity ball structure.

Figure 5:
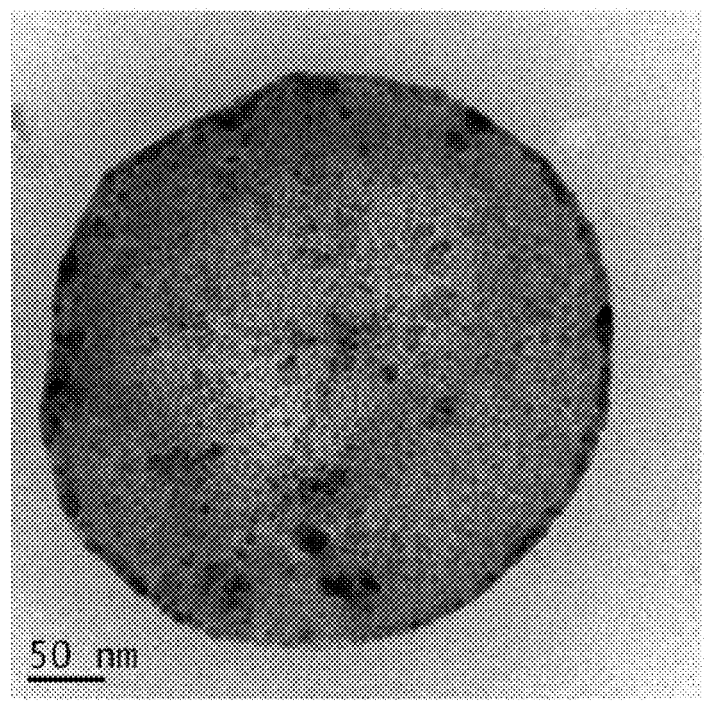
FIG. 5 is a transmission electron microscopy picture of the closed-shell aerogel particle of the present invention.
Figure 6:
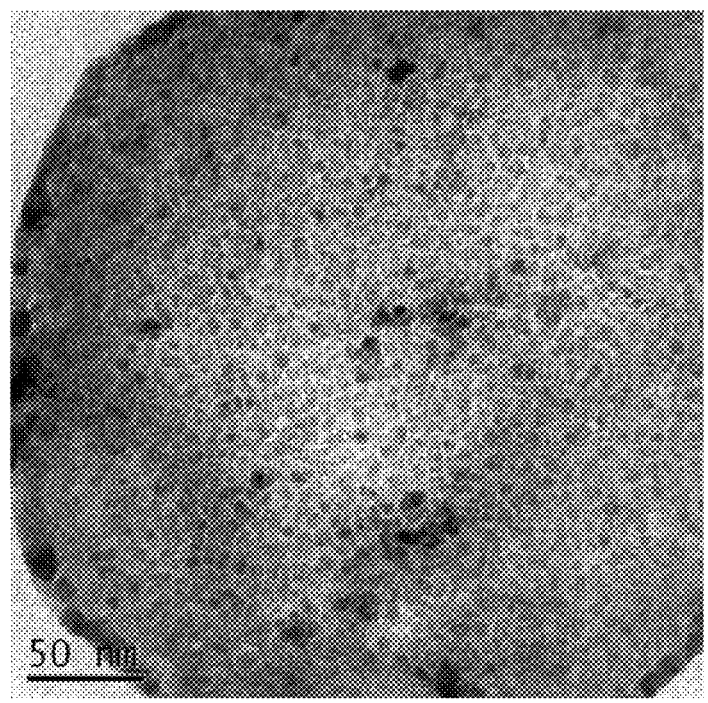
FIG. 6 is a scale-up picture of the transmission electron microscopy of the closed-shell aerogel particle of the present invention.

Please refer to FIG. 5 and FIG. 6, which are microscope pictures of the inner structure and the pore distribution of the aerogel particle by scanning electron microscope in different scale. FIG. 5 and FIG. 6 show the aerogel particle is aggregated to form a nano-scale aerogel structure.

Figure 7:
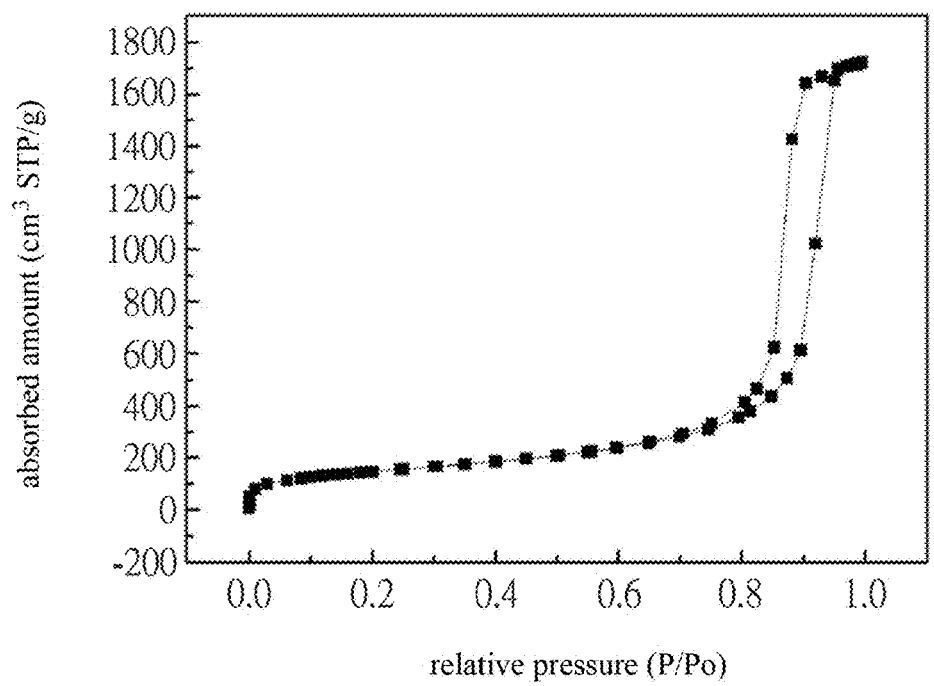
FIG. 7 is an absorbed curve diagram and a desorbed curve diagram of the aerogel particle without subjecting to the hydrophobic modified process in nitrogen gas.
Figure 8:
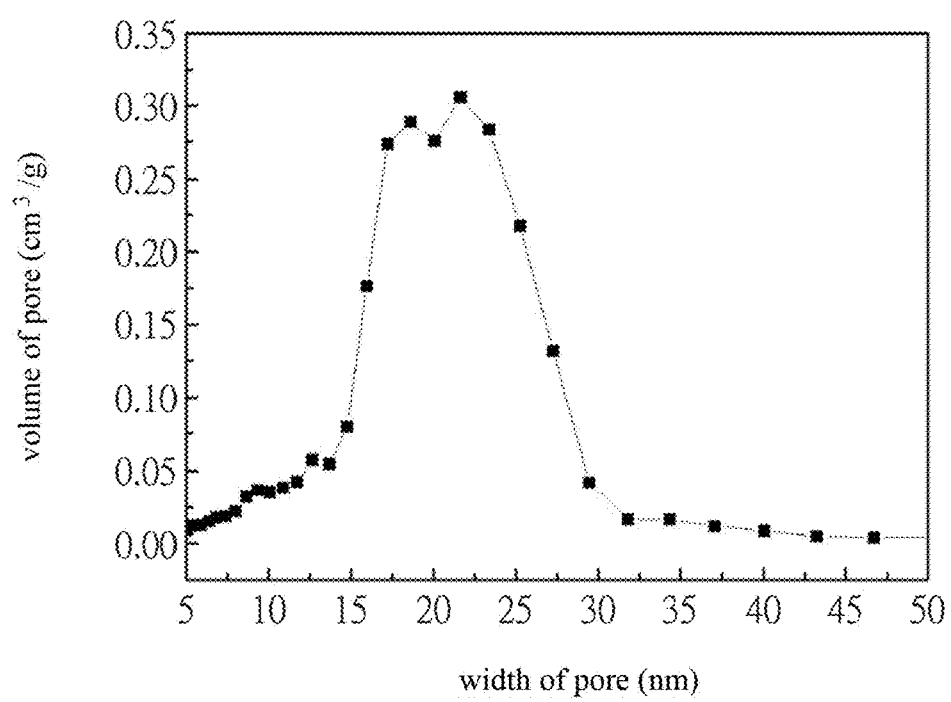
FIG. 8 is a pore distribution diagram of the aerogel particle according to FIG. 7.
Figure 9:
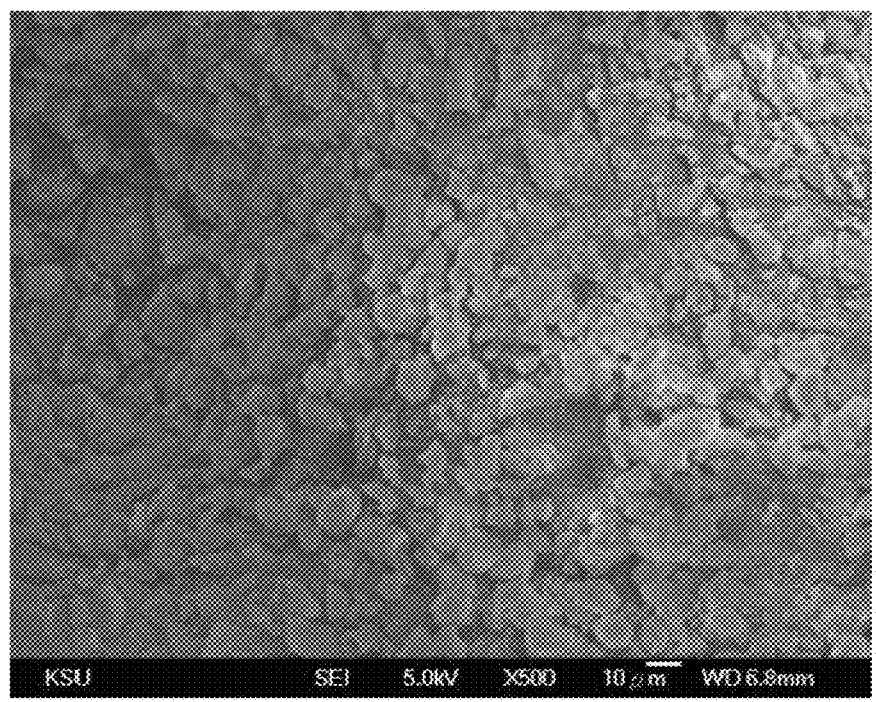
FIG. 9 is scanning electron microscope picture of a commercial aerogel powder under a scaling factor 500.
Figure 10:
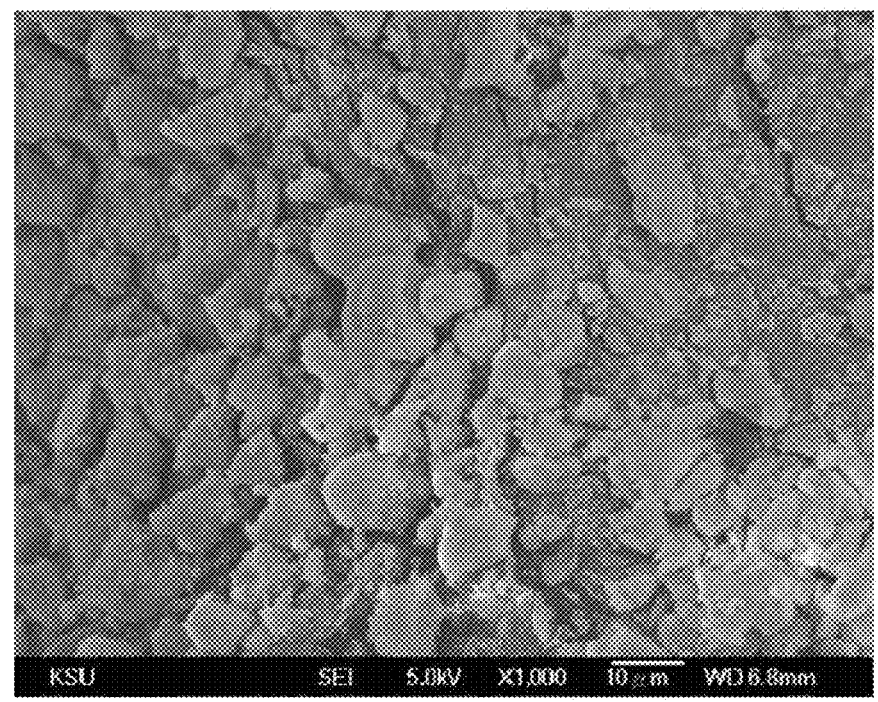
FIG. 10 is scanning electron microscope picture of a commercial aerogel powder under a scaling factor 1,000.
Figure 11:
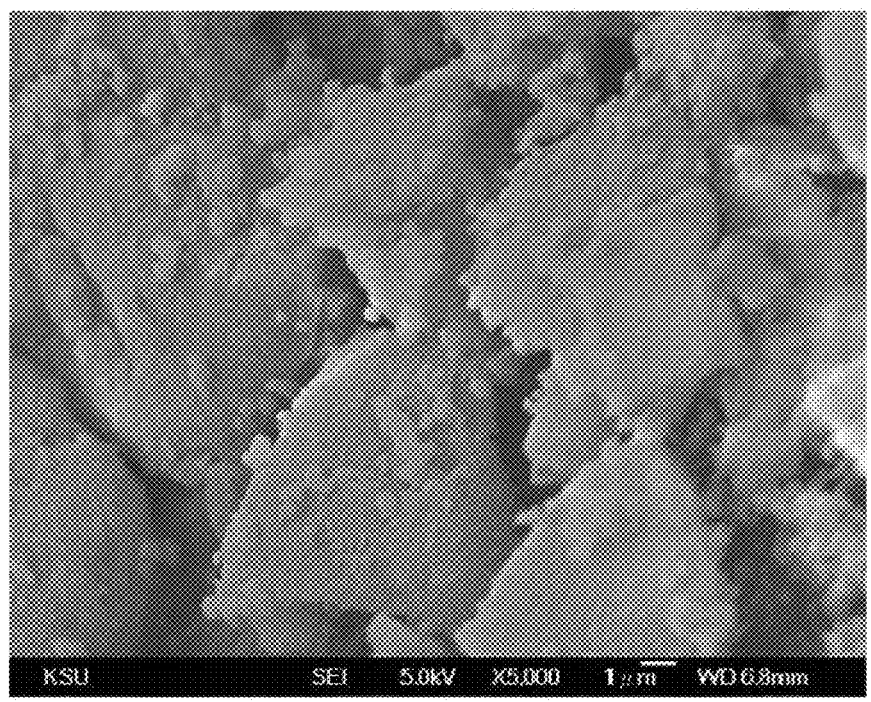
FIG. 11 is scanning electron microscope picture of a commercial aerogel powder under a scaling factor 5,000.
Figure 12:
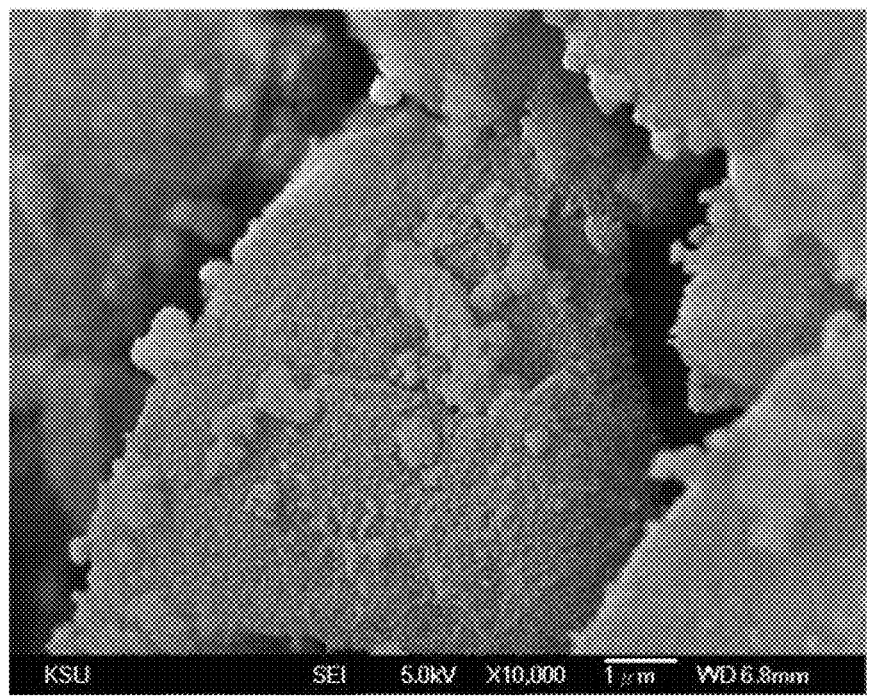
FIG. 12 is scanning electron microscope picture of a commercial aerogel powder under a scaling factor 10,000.

Please refer to FIG. 7, which shows an absorbed curve diagram and a desorbed curve diagram of the aerogel particle without subjecting to the hydrophobic modified process in nitrogen gas. Please refer to FIG. 8, which shows a pore distribution diagram converted from the absorbed curve diagram and the desorbed curve diagram of the aerogel particle without subjecting to the hydrophobic modified process.

As is understood by a person skilled in the art, the foregoing preferred embodiments of the present invention are illustrated of the present invention rather than limiting of the present invention. In view of the foregoing, it is intended to cover various modifications and similar arrangements included within the spirit and scope of the appended claims. Therefore, the scope of which should be accorded the broadest interpretation so as to encompass all such modifications and similar structure.

What is claimed is:

1. A method of producing a hydrophobic aerogel particle, comprising:
    performing a mixing process, wherein an alkoxysilane compound is mixed with a solvent to form a first mixed solution; wherein the solvent includes a mixture of ethanol and water;
    performing a hydrolysis process to the first mixed solution, wherein an acid catalyst is added into the first mixed solution to perform a hydrolysis reaction, thereby forming a sol;
    performing a condensation process to the sol, wherein an alkali catalyst is added into the sol to perform a condensation reaction, and a hydrophobic dispersion solvent is added and stirred during the condensation process, thereby subjecting the sol to be gelled when it is stirred, further producing a second mixed solution including a gel particle, wherein the hydrophobic dispersion solvent is selected from a group consisting of ketone, ether, ester, aromatic and alkane; and heating the second mixed solution to evaporate the solvent, and adding a chloryl organic molecule to subject the chloryl organic molecule to react with a hydroxyl group of the gel particle, wherein the gel particle becomes hydrophobic, and, further preventing the hydrophobic gel particle from being broken by the hydrophobic dispersion solvent; and sequentially varying a temperature of the second mixed solution to a first temperature, a second temperature, and a third temperature, the first temperature being 78° C. to 82° C., the second temperature being 100° C. to 115° C., the third temperature being 40° C. to 45° C., and when the temperature of the second mixed solution is varied to the third temperature, the chloryl organic molecule is added; and performing a post-treatment process including drying the hydrophobic gel particle in vacuum to obtain the hydrophobic aerogel particle.

2. The method of producing an aerogel particle of claim 1, wherein a molar ratio of a mole of the alkali catalyst to a mole of the acid catalyst is 1.0:1.0 to 3.0:1.0.

3. The method of producing the aerogel particle of claim 1, wherein the sol is stirred at 1200 rpm to 2000 rpm when the condensation process is performed.

4. The method of producing the aerogel particle of claim 1, wherein the hydrophobic aerogel particle has a uniformly pearl-like structure or a uniformly ball-like structure.

5. The method of producing the aerogel particle of claim 1, wherein the chloryl organic molecule is selected from a group consisting of chloryl alkoxysilane, chloryl alkane and chlorophene.

6. The method of producing the aerogel particle of claim 1,
wherein the post-treatment process further includes filtering the hydrophobic gel particle out by a filter and washing with toluene prior to the hydrophobic gel particle being dried in vacuum.

7. The method of producing the aerogel particle of claim 6, wherein the sol is stirred at 1200 rpm to 2000 rpm when the condensation process is performed.

8. The method of producing the aerogel particle of claim 1, wherein the hydrophobic aerogel particle is a core-shell particle.

9. The method of producing the aerogel particle of claim 8, wherein the core-shell particle has a porous closed-shell.

* * * * *